3,075,826
SEPARATION OF CESIUM VALUES FROM AQUEOUS SOLUTION
Peter R. Gray, Midland, Mich., assignor to The Dow Chemical Company, Midland, Mich., a corporation of Delaware
No Drawing. Filed May 13, 1959, Ser. No. 812,788
11 Claims. (Cl. 23—25)

The invention relates to a method for the separation of cesium values from aqueous solution, the method having particular value in the recovery of cesium values from an aqueous solution of radioactive waste obtained as in processing spent fuel elements.

One of the facets of the nuclear energy program is the problem of disposal or utilization of radioactive waste which results from the wet chemical processing of spent fuel. It has been the practice to dissolve spent fuel in nitric acid and thereafter to selectively remove fissionable material leaving substantially all the fission products, alloying elements and cladding materials and some residual fissionable material in solution. In the projected nuclear economy large volumes of these fission product waste solutions will be generated. Unless utilized in some way, these waste solutions must be stored in expensive containers, thereby increasing the cost of nuclear power. The fission product components, singly or severally, when isolated in pure or concentrated form may be used as radiation sources useful in medicine, as in radiotherapy, and in industry, as in thickness gauges, radiography, tracer studies, etc. One of the more valuable fission products is 26.6 year cesium 137. Radioactive cesium has been separated from other fission products heretofore by a precipitation process in which the cesium is cocrystallized with potassium alum. In this process multiple countercurrent stages are necessary for high yields and complete decontamination from other fission products and further processing is necessary to separate the cesium from the alum.

Accordingly, it is an object of this invention to provide a method which overcomes the disadvantages of the known method and by which either cesium bromide or cesium chloride in high purity and good yield is readily obtained from an aqueous nitric acid solution containing fission products which include cesium values.

Another object of the invention is to provide a method of recovering cesium from an aqueous solution containing cesium bromide.

Still another object of the invention is to provide a method of recovering cesium from an aqueous solution containing cesium values which are convertible to the bromide form.

The invention is predicated on the discovery that upon heating an aqueous solution containing cesium bromide, water-soluble molybdenum (VI) values and hydrobromic acid together substantially in the absence of anions other than bromide and molybdate ions the molybdenum (VI) is reduced to pentavalent form and upon concentrating and cooling the said solution cesium is precipitated as cesium molybdenyl pentabromide. On separating the so-formed pentabromide precipitate, cesium values are recovered from the so-treated aqueous solution. If desired, either cesium bromide or cesium chloride in purified form may be prepared from cesium molybdenyl pentabromide according to additional processing steps hereinafter more fully described.

In carrying out the method of the invention hydrobromic acid is added to an aqueous solution containing cesium bromide and molybdenum (VI) values and the admixture heated whereby the hydrobromic acid reduces the molybdenum to the pentavalent state. Thereafter the said solution is concentrated as by further heating to evaporate water therefrom until the boiling temperature of the solution under atmospheric pressure is in the range of 120 to 160° C. As a practical matter, the reduction of the molybdenum (VI) values is usually carried out at the boiling temperature of the solution at atmospheric pressure and concurrently with the concentration process.

Upon allowing the concentrated solution containing cesium bromide and molybdenum (V) values in hydrobromic acid medium to cool to a temperature below about 40° C. and preferably to a temperature below 25° C. a crop of the red to reddish-brown crystals of the complex salt, $Cs_2MoOBr_5$ are precipitated. This crop of crystals is then separated from the mother liquor as by filtration or centrifugation and decantation and washed with isopropyl alcohol or with a small amount of an aqueous liquid, preferably concentrated hydrobromic acid. As an example of the washing step, 40 milliliters of 48 percent hydrobromic acid were employed in washing about 2.5 grams of precipitated and separated $Cs_2MoOBr_5$.

In obtaining a good recovery efficiency of cesium from aqueous solution, it is essential that there by employed at least a stoichiometric amount of molybdenum (VI) in soluble form and from 150 to 200 percent of the stoichiometric amount of hydrobromic acid based on the theoretical proportions of cesium, molybdenum and bromine according to the formula $Cs_2MoOBr_5$. If molybdenum values are not present in the requisite amount in the cesium-containing solution, they must be added. Suitable forms of molybdenum for use in the practice of the invention include molybdic acid, ammonium molybdate and a solution of molybdenum metal in aqua regia. Alkali metal molybdates may also be used, though they are less desirable, since in using them there is added to the solution additional metal cations which must be later separated from the cesium values in order to prepare a highly purified cesium compound such as cesium bromide.

It is also essential in minimizing the solubility of $Cs_2MoOBr_5$ to remove substantially all anions other than bromide ions and about the requisite amount of molybdenum (V) ions. The removal from solution of interfering anions may be effected by well known methods such as those involving the destruction of the ion by oxidation or reduction or by removal of the ion as an insoluble precipitate or as a volatile compound. For example, the nitrate ion may be destroyed by reaction with a reducing agent such as a chloride, bromide or iodide or mixtures thereof though care must be exercised to avoid using an excess of chloride or iodide which would in turn need to be removed from solution. If the cesium solution contains radioactive ruthenium values, for safety reasons it is desirable to maintain a reducing atmosphere over the solution as with hydrogen bromide to prevent the escape of ruthenium tetroxide in gaseous form, or, alternatively, to provide a suitable system for collecting the radioactive vapor.

In addition, because cesium molybdenyl pentabromide is actually sparingly soluble rather than highly insoluble in hydrobromic acid medium, it is necessary to adequately concentrate the pentabromide solution whereby on cooling the solution most of the cesium is precipitated therefrom as $Cs_2MoOBr_5$. A pentabromide solution having a boiling temperature in the range of 120 to 160° C. is generally concentrated enough to yield from 60 to 99 percent of the cesium content on cooling to at least 25° C.

The recovery efficiency of cesium values according to the invention may also be improved by adding isopropanol to the concentrated pentabromide solution, preferably after the solution is cooled, to promote more complete precipitation of $Cs_2MoOBr_5$. The addition of isopropanol may be made as desired before or after the separation of the first crop of $Cs_2MoOBr_5$ from the mother liquor. While the isopropanol addition often causes the precipitation of cesium both as $Cs_2MoOBr_5$ and CsBr this is not at all a disadvantage in the process of recovering cesium as a highly purified bromide or chloride.

Crystalline cesium molybdenyl pentabromide may be freed of its molybdenum content by taking up the separated washed solid in a small amount of hot water, separating any insoluble material from the aqueous solution, and adding to the aqueous solution a carrier, such as iron, lanthanum or yttrium, preferably in the form of a bromide, plus sufficient alkali metal hydroxide to precipitate the carrier as the hydroxide. The precipitated hydroxide is then separated from the supernatant solution as by filtration. Molybdenum is carried along with the so-formed flocculent hydroxide precipitate. Cesium values are not precipitated but remain in the supernatant liquid as an aqueous solution consisting mainly of a mixture of cesium and alkali metal hydroxides. These cesium values are subsequently freed of alkali metal ions by the following sequence of steps.

The alkaline solution of cesium and alkali metal ions is acidified with hydrobromic acid and evaporated to dryness to cause precipitation and crystallization of the mixed bromides. To separate cesium bromide from the so-obtained crystallized mixture, the dried bromide crystals are leached with about 10 parts by weight of liquid bromine per part of cesium (as CsBr) in the mixture to selectively dissolve the cesium bromide, though more bromine may be used if desired. One way to carry out the separation is to mix the dried bromide crystals with the liquid bromine and then separate the undissolved portion from the resulting solution as by filtration. The separated undissolved crystals are then washed with additional liquid bromine and the washings added to the solution. The cesium bromide is recovered from the bromine solution by evaporating the liquid bromine therefrom. As the liquid bromine evaporates, crystals of cesium monobromide are formed substantially free from other alkali metal bromides. The bromine thus evaporated may be condensed and reused in the process.

At this stage the cesium bromide obtained according to the invention is fairly pure. In the event it is radioactive cesium obtained from a mixture of fission products it will be found that the cesium bromide has been freed of other fission products, or in other words, is radioactively pure. If desired, chemical purity, and hence specific activity, can be increased slightly by dissolving the cesium bromide in about an equal weight of water, filtering and then adding from about 2 to 20 milliliters of isopropyl alcohol per milliliter of clarified aqueous solution, though more alcohol may be used if desired, whereby the cesium bromide is precipitated. The so-obtained precipitate is then washed once with isopropyl alcohol, a volume equal to about half the volume of alcohol used in the precipitation step being adequate.

The specific activity of so-purified radioactive cesium in bromide form may also be increased by converting the cesium bromide to chloride form. This is accomplished by dissolving the said cesium bromide in water and repeatedly adding aqueous hydrochloric acid to the bromide solution and heating the mixture until substantially all of the bromide ion has been evaporated as hydrogen bromide leaving a chloride solution. Upon evaporating the so-formed chloride solution to dryness, crystalline cesium chloride is obtained.

While a procedure for converting cesium molybdenyl pentabromide to cesium bromide or cesium chloride has been described above, other conversion methods may be used. As an example, ion exchange techniques may be employed. In J. Chem. Phys., 57,819 (1953), there is described the use of IR-1 resin in the acid form to separate alkali metal ions from each other as well as from a number of other metal ions. 0.1 normal hydrochloric acid is employed as the elutrient and cesium is recovered as the chloride. In the event cesium bromide is the preferred product, hydrobromic acid is used as the elutrient instead of hydrochloric acid.

In J.A.C.S., 70, 1986 (1946), there is described an ion exchange method of separating cesium from aqueous solution on the resin Dowex-50.

As a further modification of the present invention an ion exchange method may be used to separate cesium from sodium and traces of rubidium in the cesium-containing hydroxide solution recovered after precipitation of molybdenum with a hydroxide carrier according to the invention. Thereafter, as described in Anal. Chem., 28, 1200 (1956), cesium in 0.5 normal hydroxide solution may be taken up on a phenolic methylene sulfonic resin along with rubidium. The rubidium is eluted from the resin with 0.5 normal NaOH and finally cesium is stripped from the resin as CsCl using 6 normal hydrochloric acid, though hydrobromic acid may also be used if CsBr is desired.

A synthetic "radioactive waste solution" was prepared in the form of an aqueous nitric acid solution containing only stable isotopes in the relative amounts representative of the distribution of radioactive ions in a waste solution obtained with a given type of reactor and fuel processing system employing fuel containing uranium 235 as the fissionable material. A "cooling" period of 100 days was assumed. In addition to the fission product elements, waste solutions typically contain residual uranium not recovered during fuel processing as well as fuel element cladding and alloying materials and corrosion products introduced during the processing cycle. The stable isotopes were provided, mainly in the form of salts or oxides, in the concentrations listed in the table below, with the exception of cesium bromide which was added separately and a few fission products which were either unavailable or required in very low concentrations. Additional neodymium was added in place of some of these latter two types so that the total rare earth content was correct.

TABLE I

*Composition of Synthetic "Radioactive Waste Solution"*

| Constituent added: | Grams/liter |
|---|---|
| $ZrOCl_2 \cdot 8H_2O$ | 5.14 |
| $Nd(NO_3)_3$ | 3.90 |
| $(NH_4)_2Ce(NO_3)_6$ | 4.44 |
| $La(NO_3)_3$ | 1.90 |
| $Y(NO_3)_3$ | 0.61 |
| $Sr(NO_3)_2$ | 1.32 |
| $Ba(NO_3)_2$ | 0.86 |
| $RbNO_3$ | 0.26 |
| Mo metal | 1.20 |
| $NH_4I$ | 0.07 |
| $RuCl_3$ hydrate | 1.93 |
| $Sm_2O_3$ | 0.17 |
| $TeO_2$ | 0.16 |
| $SbCl_3$ | 0.02 |
| $Cd(NO_3)_3$ | 0.04 |
| $SnCl_2$ | 0.04 |
| $Al(NO_3)_3 \cdot 9H_2O$ | 226.8 |
| $Fe(NO_3)_3 \cdot 6H_2O$ | 219.0 |
| $Ni(NO_3)_3 \cdot 6H_2O$ | 4.95 |
| $CrO_3$ | 0.96 |
| $Pb(NO_3)_2$ | 0.80 |
| $UO_2(NO_3)_2 \cdot 6H_2O$ | 90.72 |

To obtain the desired concentration of each constituent listed in the table in a predetermined volume of solution, an appropriate amount was weighed out. The so measured amounts of constituents were dissolved in water and the requisite amount of nitric acid was added to make the final solution 3 to 5 normal in nitric acid. Water was then added to bring the acidified solution to the predetermined volume.

EXAMPLE I 2.0682 grams of cesium bromide were dissolved in 1000 milliliters of the synthetic "radioactive waste solution" described above and the resulting solution along with 500 milliliters of technical grade 48 percent hydrobromic acid was placed in a 2-liter 3-necked round bottom flask equipped with a water cooled condenser and heating means. Heating of the flask and contents was carried out to bring the contents to boiling and effluent gases from the condenser were bubbled through a solution of caustic. When bromine effluence from the waste solution ceased additional hydrobromic acid in 250 milliliter portions was added until a total of 1600 milliliters of 48 percent hydrobromic acid had been added. An additional 700 milliliters of 48 percent hydrobromic acid was added to the solution and the water condenser removed from the flask. Heating was continued to concentrate the solution until the solution boiling temperature reached 130° C. The concentrated solution was allowed to cool to 25° C. whereupon crystals of crude $Cs_2MoOBr_5$ precipitated. The precipitate was separated by centrifugation and decantation, washed with 40 milliliters of 48 percent hydrobromic acid and air dried. 4.6243 grams of crude cesium molybdenyl bromide were so recovered.

The crude pentabromide was then leached with 150 milliliters of boiling water and the aqueous solution was separated from insoluble material by centrifugation. The insoluble material was discarded. 5 grams of yttrium nitrate were added to the aqueous solution and the solution made alkaline by the addition of caustic. The resulting hydroxide precipitate was separated by centrifugation and decantation. The alkaline supernatant solution was then acidified with 48 percent hydrobromic acid and evaporated to dryness. The so obtained mixture of sodium and cesium bromide crystals were intimately admixed with about 40 milliliters of liquid bromine and the resulting bromine solution of cesium bromide was separated from insoluble salts by filtration through a fritted glass filter. The insoluble residue was washed with about 20 milliliters of liquid bromine. The washings were combined with the filtrate and the mixture heated to cause evaporation of the bromine. 1.2735 grams of cesium bromide product were recovered representing a recovery efficiency of about 62 percent. X-ray fluorescence analysis of the product showed it contained 99 percent CsBr.

EXAMPLE II 2.0013 grams of cesium bromide and the following tracers were dissolved in 1000 milliliters of the synthetic "radioactive waste solution" described hereinabove.

| Isotope | Amount of Activity in Microcuries | Observed Counting Rate, Counts per Minute. |
| --- | --- | --- |
| Cs 137 | 10 | 150,000 |
| Ce 144—Pr 144 | 20 | 600,000 |
| Ru 106—Rh 106 | 20 | 275,000 |
| Zr 95—Nb 95 | 7 | 110,000 |

The so prepared solution plus 500 milliliters of technical grade 48 percent hydrobromic acid was placed in a 2-liter 3-necked round bottom flask equipped with a water cooled condenser and heating means and heating of the flask and contents was begun to bring the contents to boiling. Effluent gases from the condenser were bubbled through a solution of caustic. When bromine effluence from the waste solution ceased, additional hydrobromic acid in 250 milliliter portions was added until a total of 1800 milliliters of acid had been added. The condenser was then removed from the flask and the flask further heated to concentrate the contents. Heating was stopped when the solution was sufficiently concentrated to have a boiling temperature of 130° C. The solution was then allowed to cool to 25° C. whereupon crystals of crude $Cs_2MoOBr_5$ precipitated. The precipitate was separated from the supernatant solution by centrifugation and decantation. The precipitate was washed with about 40 milliliters of 48 percent hydrobromic acid and air dried. The so-obtained crude $Cs_2MoOBr_5$ weighed 4.3394 grams and on radio-chemical examination exhibited the following activity.

| Isotope: | Observed counting rate, counts per minute |
| --- | --- |
| Cs 137 | 90,000 |
| Ce 144—Pr 144 | 100,000 |
| Ru 106—Rh 106 | 90,000 |
| Zr 95—Nb 95 | 45,000 |

The crude pentabromide was then leached with 100 milliliters of boiling water and the supernatant solution recovered by centrifugation and decantation. Radiochemical examination of the insoluble residue showed all cesium 137 had been removed therefrom by the hot water leach. 5 grams of yttrium nitrate were added to the aqueous solution and the solution made alkaline by the addition of concentrated caustic solution. The resulting hydroxide precipitate was separated by centrifugation and decantation. The alkaline supernatant solution was then acidified with 48 percent hydrobromic acid and evaporated to dryness. The so-obtained mixture of sodium and cesium bromide crystals were intimately admixed with about 40 milliliters of liquid bromine and the resulting bromine solution of cesium bromide separated from insoluble salts by filtration through a fritted glass filter. The insoluble residue was washed with about 20 milliliters of liquid bromine. The washings were combined with the filtrate and the mixture heated to cause evaporation of the bromine. 1.3300 grams of cesium bromide product were recovered representing a recovery efficiency of 67 percent. The product showed a count rate of 90,000 counts per minute for cesium 137.

EXAMPLE III 1.9978 grams of cesium bromide and 2 milliliters of a solution containing enough cesium 137 to have an activity of 450,900 counts per minute were dissolved in 1,000 milliliters of the synthetic "radioactive waste solution" previously described. The so-prepared solution plus 500 milliliters of technical grade 48 percent hydrobromic acid was placed in a 2-liter 3-necked round bottom flask equipped with a water cooled condenser and heating means. Heating of the flask and contents was begun to bring the contents to boiling. Effluent gases from the condenser were bubbled through a solution of caustic. When bromine effluence from the waste solution ceased, a 550 milliliter portion of 48 percent hydrobromic acid was added to the solution and subsequently an additional 350 milliliters of the acid. After an additional heating period the solution was allowed to cool overnight. Then 750 milliliters of 48 percent hydrobromic acid were added to the solution and the condenser was removed from the flask and the flask further heated to concentrate the contents. Heating was stopped when the boiling temperature of the solution reached 150° C. The acidic solution was then cooled to 50° C. and 300 milliliters of isopropyl alcohol admixed therewith. Precipitation of $Cs_2MoOBr_5$ commenced and the alcohol admixture was allowed to cool further to about room temperature. The precipitate was separated from the supernatant mother liquor by centrifugation and decantation and the precipitate washed with about 50 milliliters of isopropyl alcohol. The so-recovered precipitate was air dried and found to weigh 12.1963 grams. Cs 137 activity in the combined supernatant mother liquor and alcohol washings was found to be only 21,460 counts per minute indicating, by difference to the initial count rate for Cs 137 activity, a recovery efficiency of better than 95 percent.

EXAMPLE IV 1.9924 grams of cesium bromide, 25 milliliters of water and 3 milliliters of a solution of Cs 137 having an activity of 1,436,000 counts per minute (2×721,000 counts per minute per gram CsBr) were admixed and dissolved in 1000 milliliters of the synthetic "radioactive waste solution" previously described. The so-prepared solution plus 500 milliliters of technical grade 48 percent hydrobromic acid was placed in a 2-liter 3-necked round bottom flask equipped with a water cooled condenser and heating means and heating of the flask and contents was begun to bring the contents to boiling. Effluent gases from the condenser were bubbled through a solution of caustic. When bromine effluence from the waste solution ceased, additional hydrobromic acid in 250 milliliter portions was added until a total of 1800 milliliters of the acid had been added. The condenser was then removed from the flask and the flask further heated to concentrate the contents. Heating was stopped when the solution was sufficiently concentrated to have a boiling temperature of 130° C. The solution was then allowed to cool to 25° C. whereupon crystals of crude $Cs_2MoOBr_5$ precipitated. The precipitate was separated from the supernatant solution by centrifugation and decantation, washed with about 25 milliliters of isopropyl alcohol and air dried. The washings were combined with the separated supernatant solution. The washed, dried precipitate weighed 2.798 grams. 3.5 liters of isopropyl alcohol were then admixed with the combined supernatant solution and washings and the admixture allowed to stand overnight to permit precipitation of additional cesium values. The so-formed precipitate was separated by centrifugation and decantation and washed with 50 milliliters of isopropyl alcohol. The washed precipitate was air dried and found to weigh 6.610 grams. Both of the dried precipitates were then separately leached with 160 milliliter portions of boiling water. In each case the insolubles were separated by centrifugation and decantation and the aqueous leach liquor evaporated to dryness. Precipitates weighing 2.1896 grams and 4.0417 grams, respectively, were recovered. Radio-chemical examination of each of the above-described precipitates showed that 63.8 percent of the initial Cs 137 activity was recovered in the crystals of $Cs_2MoOBr_5$ precipitated from aqueous acidic solution while an additional 35.3 percent was recovered in the cesium values precipitated by addition of the alcohol to the super natant solution, for a total recovery of 99.1 percent of the Cs 137 activity. The dried precipitate of $Cs_2MoOBr_5$ obtained after separation of water-insolubles still showed 63.0 and 34.5 percent, respectively, of the original Cs 137 activity for a total of 97.5 percent recovery of Cs 137 activity as a purified $Cs_2MoOBr_5$. Thus cesium present to the extent of 0.28 weight percent in the synthetic "radioactive waste solution" was concentrated to the level of 13.1 weight percent (ave.) in the crude pentabromide precipitate and to the level of 19.5 weight percent in the reprecipitated pentabromide.

EXAMPLE V 20 milliliters of an aqueous solution of cesium bromide containing 1 gram per milliliter of CsBr plus some Cs 137 tracer and a molybdenum solution prepared by dissolving 12 grams of molybdenum metal in 150 milliliters of 1:1 HCl—$HNO_3$ and 750 milliliters of technical grade 48 percent hydrobromic acid were placed in a 2-liter 3-necked round bottomed flask provided with a water cooled condenser and heating means. The flask and contents were heated. When the evolution of bromine ceased, 300 milliliters of 48 percent hydrobromic acid were added to the flask and heating was continued. After about 15 minutes the condenser was removed from the flask and an additional 400 milliliters of the 48 percent hydrobromic acid were added to the flask and heating continued until the solution boiling temperature reached 126° C. On allowing the concentrated solution to cool a crop of $Cs_2MoOBr_5$ crystals was obtained. These were separated from the supernatant solution by centrifugation and decantation, and washed with both a 20 milliliter and a 30 milliliter portion of 48 percent hydrobromic acid. The so-washed crystals were further washed twice with 40 milliliter portions of isopropyl alcohol and then oven dried at 125° C. The separated supernatant solution and washings were combined in the said flask and further concentrated by heating until the boiling temperature reached 145° C. No additional precipitate formed on allowing the flask and contents to cool. The oven dried $$Cs_2MoOBr_5$$

product weighed 34.0539 grams and exhibited an activity of 369,600 counts per minute (99.1 percent yield). The combined concentrated supernatant solution and washings exhibited an activity of 3,450 counts per minute.

What is claimed is:

1. A method of recovering cesium and molybdenum values from an aqueous solution containing cesium bromide and at least about 0.5 mole of molybdenum (VI) values per mole of cesium bromide, substantially all anions present being bromide and molybdate ions, compring adding to the solution an amount of hydrogen bromide by weight equal to from about 2 to 3 times the weight of the cesium bromide, heating the so-formed mixture whereby molybdenum (VI) values are reduced to the pentavalent state, concentrating the aqueous solution whereby cesium values are precipitated as $Cs_2MoOBr_5$, and separating the so-precipitated $Cs_2MoOBr_5$ from the supernatant solution.

2. The method as in claim 1 in which additional $Cs_2MoOBr_5$ is precipitated from the said supernatant solution by the addition of isopropyl alcohol and the additional precipitated $Cs_2MoOBr_5$ is separated from the supernatant aqueous alcoholic solution.

3. The method of recovering cesium and molybdenum values from an aqueous solution containing cesium bromide, substantially all anions present being bromide ions, comprising adding about 0.5 mole of hexavalent molybdenum in water soluble form per mole of cesium bromide in the solution and an amount of hydrogen bromide by weight equal to from about 2 to 3 times the weight of the cesium bromide, heating the so-formed mixture whereby molybdenum (VI) values are reduced to the pentavalent state, concentrating the aqueous solution by evaporating water therefrom whereby cesium values are precipitated as $Cs_2MoOBr_5$ and separating the so-precipitated $Cs_2MoOBr_5$ from the supernatant solution.

4. The method of recovering cesium bromide from an aqueous nitric acid solution of radioactive waste containing cesium values and at least about 0.5 mole of molybdenum (VI) values per mole of cesium, and said aqueous nitric acid solution containing as anions substantially only molybdate ions, nitrate ions, anions capable of being destroyed by the reducing agent and anion capable of forming volatile compounds in the solution during a heating step in the presence of aqueous hydrobromic acid comprising adding to the solution a reducing agent thereby destroying the nitrate ion, adding to the so-treated solution an amount of hydrogen bromide by weight equal to from about 2 to 3 times the weight of the cesium present expressed as cesium bromide, heating the so-formed aqueous mixture whereby molybdenum (VI) values are reduced to the pentavalent state, concentrating the aqueous mixture by evaporating water therefrom whereby cesium values are precipitated on allowing the aqueous mixture to cool, separating the so-precipitated cesium values from the supernatant solution, contacting the separated precipitate with hot water whereby cesium values are taken up to form an aqueous solution, adding to the aqueous solution the salt of a polyvalent metal cation selected from the group consisting of bromides and nitrates of iron and the rare earth metals and mixtures thereof, adding an alkaline material to said solution whereby said polyvalent metal cation is precipitated as the hydroxide, separating the supernatant solution from said precipitated hydroxide, acidifying said supernatant solution with hydrogen bromide, evaporating said acidified solution to dryness whereby mixed bromide crystals are formed, leaching cesium bromide from the mixed bromide crystals with liquid bromine and evaporating the liquid bromine whereby solid cesium bromide is recovered.

5. The method as in claim 4 in which the reducing agent is selected from hydrogen bromide, sodium bromide and mixtures thereof.

6. The method as in claim 4 in which the alkaline material used to precipitate the hydroxide of the polyvalent metal cation is caustic soda.

7. The method as in claim 4 in which the solid cesium bromide recovered from liquid bromine solution is further purified by dissolving the cesium bromide in water and re-precipitating it therefrom by the addition of isopropyl alcohol and separating the so-precipitated cesium bromide from the aqueous alcoholic solution.

8. The method of recovering cesium values from an aqueous nitric acid solution of radioactive waste containing cesium values and at least about 0.5 mole of molybdenum (VI) values per mole of cesium, and said aqueous nitric acid solution containing as anions substantially only molybdate ions, nitrate ions, anions capable of being destroyed by the reducing agent and anions capable of forming volatile compounds in the solution during a heating step in the presence of aqueous hydrobromic acid comprising treating the solution with a reducing agent whereby the nitrate ion is destroyed, adding to the so-treated solution an amount of hydrogen bromide by weight equal to from about 2 to 3 times the weight of the cesium present expressed as cesium bromide, heating the so-formed aqueous mixture to an elevated temperature whereby molybdenum (VI) values are reduced to the pentavalent state, concentrating the aqueous mixture by evaporating water therefrom whereby cesium values are precipitated on allowing the aqueous mixture to cool, separating the so-precipitated cesium values from the supernatant solution, contacting the separated precipitate with hot water whereby cesium values are taken up to form an aqueous solution, adding to the aqueous solution the salt of a polyvalent metal cation selected from the group consisting of bromides and nitrates of iron and the rare earth metals and mixtures thereof, adding an alkaline material to said solution whereby said polyvalent metal cation is precipitated as the hydroxide, separating the supernatant solution from said precipitated hydroxide, and recovering cesium values from the said supernatant solution as a halide selected from the group consisting of cesium bromide, cesium chloride by the ion exchange method.

9. The method as in claim 4 in which the said solid cesium bromide which is recovered is dissolved in water thereby forming an aqueous bromide solution, repeatedly adding to the aqueous bromide solution aqueous hydrochloric acid, heating the so-formed aqueous mixture whereby substantially all of the bromide ion has been evaporated as HBr leaving a chloride solution, and evaporating water from the chloride solution whereby crystalline cesium chloride is obtained.

10. A method of recovering cesium values from an aqueous solution containing cesium bromide and molybdenum (VI) values, substantially in the absence of anions other than bromide and molybdate ions, comprising adding to the solution an amount of hydrogen bromide by weight equal to from about 2 to 3 times the weight of the cesium bromide, heating the so-formed mixture whereby molybdenum (VI) values are reduced to the pentavalent state, concentrating the aqueous solution whereby cesium values are precipitated as $Cs_2MoOBr_5$, separating the so-precipitated $Cs_2MoOBr_5$ from the supernatant solution, contacting the separated $Cs_2MoOBr_5$ with hot water whereby cesium values are taken up to form an aqueous solution, adding to the aqueous solution the salt of a polyvalent metal cation selected from the group consisting of bromides and nitrates of iron and the rare earth metals and mixtures thereof, adding an alkaline material to said solution whereby said polyvalent metal cation is precipitated as the hydroxide, separating the supernatant solution from said precipitated hydroxide, acidifying said supernatant solution with hydrogen bromide, evaporating said acidified solution to dryness whereby mixed bromide crystals are formed, leaching cesium bromide from the mixed bromide crystals with liquid bromine and evaporating the liquid bromine whereby solid cesium bromide is recovered.

11. The method of recovering cesium bromide from an aqueous nitric acid solution of radioactive waste containing cesium values and at least about 0.5 mole of molybdenum (VI) values per mole of cesium, and said aqueous nitric acid solution containing as anions substantially only molybdate ions, nitrate ions, anions capable of being destroyed by the reducing agent and anions capable of forming volatile compounds in the solution during a heating step in the presence of aqueous hydrobromic acid comprising adding aqueous hydrobromic acid to the nitric acid solution and heating the nitric acid solution thereby destroying the nitrate ion, adjusting the hydrogen bromide content of the so-treated solution to an amount by weight equal to from about 2 to 3 times the weight of the cesium present, expressed as cesium bromide, concentrating the treated solution by evaporating water therefrom whereby cesium values are precipitated on allowing the solution to cool, separating the so-precipitated cesium values from the supernatant solution, contacting the separated precipitate with hot water whereby cesium values are taken up to form an aqueous solution, adding to the aqueous solution the salt of a polyvalent metal cation selected from the group consisting of bromides and nitrates of iron and the rare earth metals and mixtures thereof, adding an alkaline material to said solution whereby said polyvalent metal cation is precipitated as the hydroxide, separating the supernatant solution from said precipitated hydroxide, acidifying said supernatant solution with hydrogen bromide, evaporating said acidified solution to dryness whereby bromide crystals are formed, leaching cesium bromide from the bromide crystals with liquid bromine and evaporating the liquid bromine whereby solid cesium bromide is recovered.

References Cited in the file of this patent

UNITED STATES PATENTS 2,481,455    Stenger    Sept. 6, 1949